May 11, 1937.  B. B. KAHN ET AL  2,079,618
STOVE
Filed April 13, 1936   3 Sheets-Sheet 1

INVENTOR.
Bertrand B. Kahn and
Carl F. Hake
BY Maréchal & Noe
ATTORNEYS

Patented May 11, 1937

2,079,618

UNITED STATES PATENT OFFICE 2,079,618

STOVE

Bertrand B. Kahn, Cincinnati, and Carl J. Hake, Hamilton, Ohio, assignors to The Estate Stove Company, Hamilton, Ohio, a corporation of Ohio Application April 13, 1936, Serial No. 74,036

6 Claims. (Cl. 219—20)

This invention relates to heating appliances and more particularly to a cooking stove and a heating system therefor.

It is a principal object of the invention to provide a stove of this character having a simple and effective means for controlling the oven temperature and for assuring proper control of the heating elements.

It is a further object to provide a means for controlling the connection and disconnection of heating elements, the same means providing for the regulation of the temperature of the oven over a desired range.

It is a further object to provide a control mechanism for preventing the simultaneous operation of baking and broiling cooking elements, and for regulating the operating temperature of the oven during baking conditions to a desired value.

It is a still further object to provide in an electric stove of the above character a simple and effective means for positively connecting and disconnecting the baking and broiling elements and limiting the maximum possible connected load, and for also regulating the oven temperature during baking operations.

It is a still further object to provide a single control device having a plurality of operable positions for energizing a broiling element and positively disconnecting the baking element from the line, for energizing the baking element and positively disconnecting the broiling element from the line, and for effecting desired temperature regulation of the oven during a broiling operation.

Other objects and advantages will be apparent from the following description, the accompanying drawings, and the appended claims.

In the drawings,—

Figure 1:
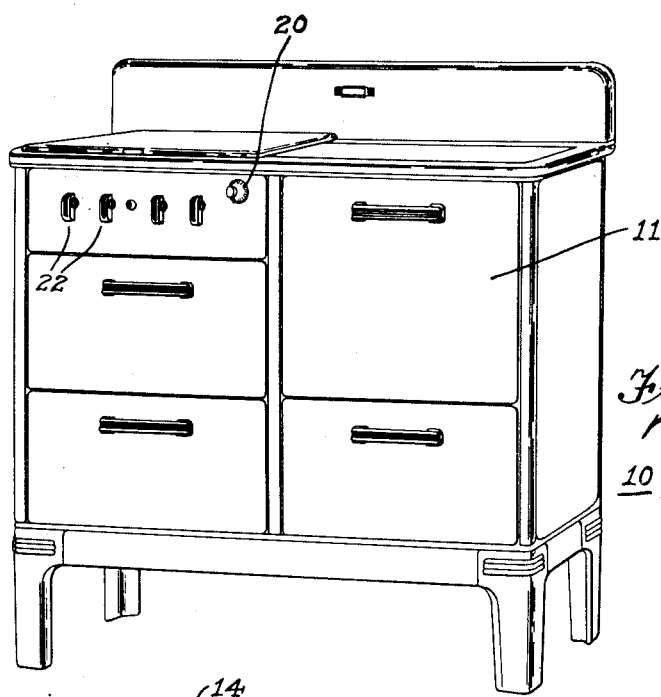
Fig. 1 is a view in perspective of a stove constructed in accordance with the present invention.
Figure 7:
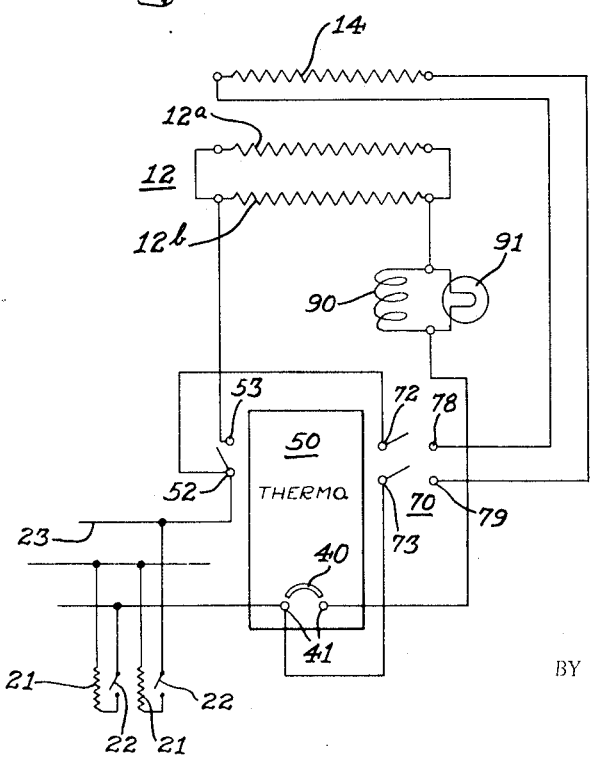
Fig. 7 is a diagrammatic view showing typical circuit connections used with this invention.
Figure 2:
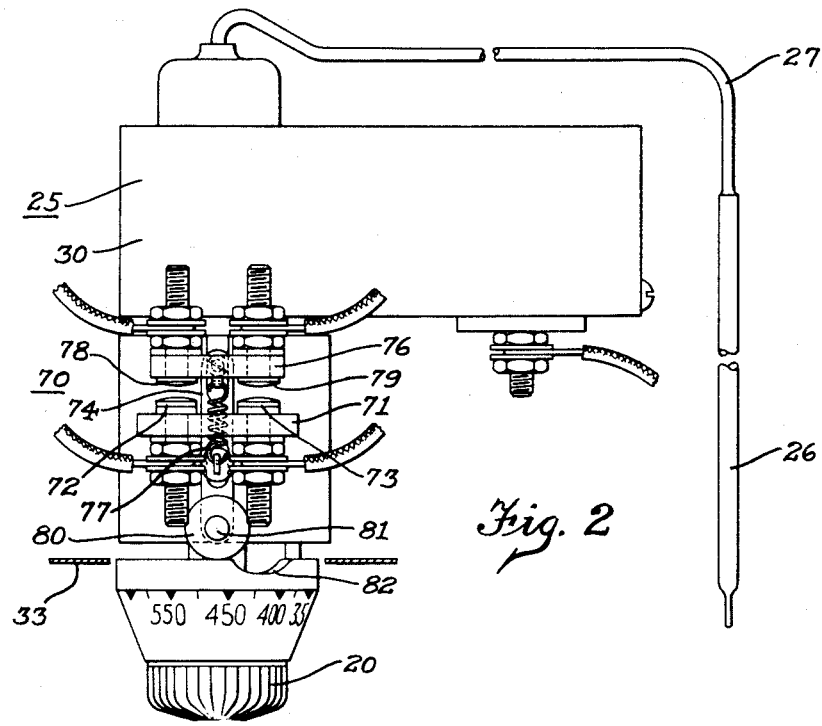
Fig. 2 is a side elevational view of the control mechanism constructed in accordance with the present invention viewed from one side.
Figure 3:
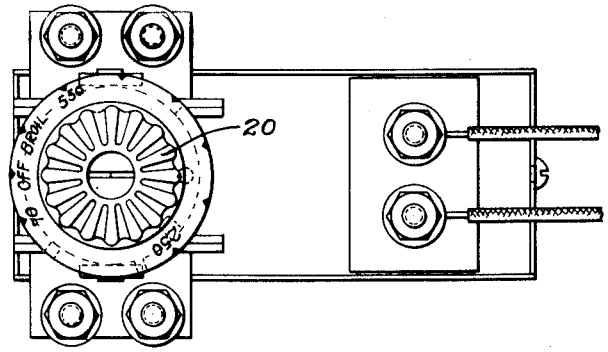
Fig. 3 is a front elevational view of the same mechanism.

In the drawings, which show a preferred embodiment of the invention there is shown the stove indicated generally at 10 and having an oven compartment designated by the numeral 11. Within this oven compartment there is positioned the baking element 12 which preferably is constructed to embody two sections 12a and 12b, the larger of which is positioned adjacent the bottom of the oven, and the smaller adjacent the top thereof in order to provide a substantially balanced heat condition throughout the oven compartment. A broiler element 14 is also provided which may be positioned within the same compartment as the oven baking elements, or it may be positioned in a separate compartment if desired. The baking elements are provided with shielded surfaces to avoid direct radiation of heat upon the material being cooked, while the broiler element is not so shielded, and is adapted to supply radiant heat for broiling purposes.

Means are provided for regulating the operating conditions of the range, this means comprising preferably a single control member or dial 20 which is mounted upon the front of the stove in convenient position for use by the operator. A plurality of cooking top elements 21 are also provided, and switch means 22 provide for selective control thereof, the cooking top elements preferably being connected across the neutral wire and alternate outside wires of the three wire power source 23.

Control dial 20 provides for the setting of a thermostatic device indicated generally by reference numeral 25. This device comprises a heat responsive element 26 which is positioned at a suitable location within the oven compartment, preferably adjacent the upper part thereof. This member is shown as of the fluid enclosed type, and has communication by means of flexible tube 27 with an expansible bellows 28. The bellows is supported within a cover member 29, forming part of a housing 30 positioned within the confines of the oven adjacent the control dial 20.

A shaft 31 is rotatably mounted within a bearing member 32 supported in housing section 30 and dial 20 is attached to the outer end thereof, extending outwardly through an aperture formed in the frame or front decorative panel 32 of the stove, thus preventing undesired access to the control mechanism. At its inner end shaft 31 carries a cup-shaped member 34 provided with longitudinally extending slots 35. An internally threaded member 36 is mounted upon threaded stud 37, and has upwardly extending lugs 38 adapted to project into the slots 35 to provide for rotation of the screw upon rotation of dial 20, but permitting axial movement of the threaded member within the cup-shaped portion 34. Stud 37 has a portion 39 which is non-circular in cross-section, and which is held in the wall 39' against rotation, but free to have axial sliding movement. The inner end of stud 39 extends adjacent the end of the bellows 28, for axial movement thereby.

A movable contact assembly 40 is adapted to be controlled by the joint action of the bellows in relation to the adjustment of dial 20, and to close with fixed contact 41 in order to effect the selective opening and closing of the bake oven circuit. Contact assembly 40 is pivotally supported from the housing by spring members 42, and is adapted to be actuated with a snap action through the ribbon spring 43 which engages the lower end of an operating lever 44 having pivoted engagement at 45 in a fixed portion of the frame. Lever 44 is also attached to a member 46 which has a bifurcated end portion 47 extending into engagement with a shoulder formed on screw 34 so that upon axial movement of the screw, this motion is transmitted through the member 46 and 44, to effect the opening and closing of contacts 40 and 41 which occurs with a snap action, thus facilitating the breaking and making of the electrical circuit.

It will be understood without further detailed discussion that with the screw 36 in any predetermined position, the bellows is caused to expand upon an increase of temperature in the oven and upon contacting the end of screw 39 the lever action is such as to effect the opening of the contacts, thereby breaking the circuit to the baking elements. Conversely when the temperature falls within the oven below the predetermined value for which the thermostat is set, bellows 28 contracts away from stud 39 thereby effecting the closing of these contacts. Adjustment of dial 20 provides for changing the initial spacing between bellows 28 and stud 39 and thereby effects the regulation of the temperature to a different temperature range.

In the arrangement shown the thermostat contacts are illustrated as of single pole character, that is, they provide for the breaking of only one side of the line. However, if desired the contact assembly 40 can be of double pole character, and operated in the same manner, to effect the opening and closing of both sides of the baking element circuit.

The thermostat is adjustable over a range of temperature values for operating conditions, and also is adjustable to a position which is indicated on the dial as "70". This designates a reference or checking position. At this point the thermostat adjustment is such that the contacts should be just about to close with the oven at a room temperature of 70°. Accordingly this 70 position provides for the setting of the thermostat in order that in operation it will indicate properly the actual temperatures which are obtained within the oven compartment. It will be understood of course that any other suitable temperature or range of temperatures may be marked and used for checking purposes. The thermostat dial is also provided with an "off" position, this position being located beyond the low temperature operating and the 70 position. Under normal operating conditions the actual temperature setting of the thermostat when in the "off" position is below normal room temperature and is such as to maintain the thermostat contacts open under all normal conditions. However, under abnormally low temperature conditions within the oven compartment, the thermostat switch might effect the closing of the contacts and the consequent energization of the heating element. Accordingly there is provided in accordance with the present invention a means to positively disconnect the baking element from the power line when the switch is adjusted to this "off" position so that under no circumstances will there be any possibility of the baking element being energized when not desired. And thus it is not necessary that the thermostat be adjustable to a low temperature position, such as to a temperature below room temperature. The thermostat adjustment need provide only for adjustment over the desired range of operating temperatures and to the check or initial setting position which may be a room temperature condition, or above as desired. Adjustment of the thermostat as such beyond this range is not required, the thermostat contacts being positively locked in the open circuit position with the control member in the off position.

Figure 6:
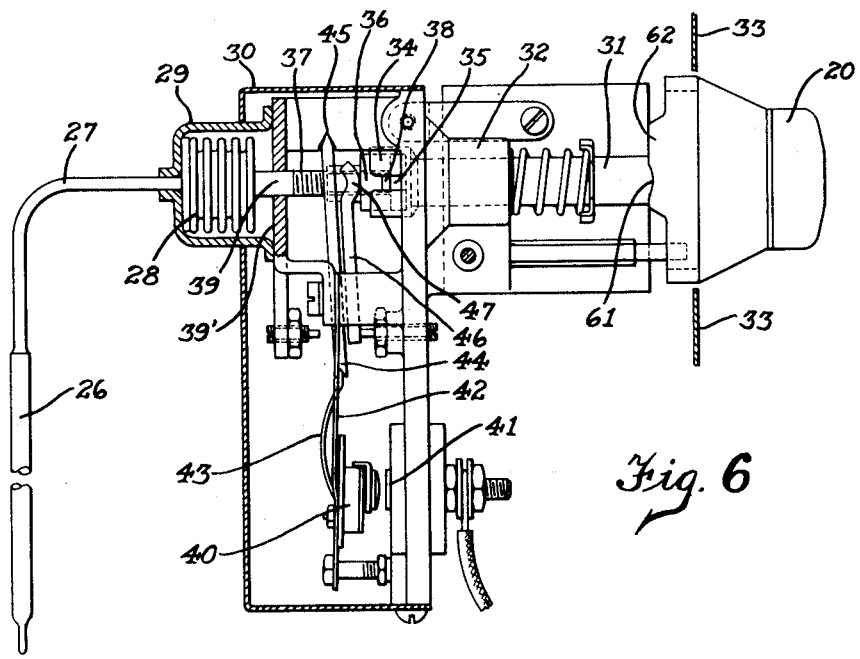
Fig. 6 is a vertical sectional view.

For this purpose there is mounted on the side of the thermostat housing 30 a switch indicated generally by reference numeral 50. This switch comprises an insulating contact support 51 within which are mounted stationary contact members 52 and 53. There is also provided upon the housing member 30 a sliding arm 54, suitably guided for longitudinal movement by means of guides 55 mounted upon the housing 30. This arm carries a contact closing assembly 56 which is adapted to be moved into contact closing position with contacts 52 and 53 by means of spring 57, one end of which engages the movable assembly. The other end of the spring is fixed to the housing and normally urges the contacts into closed circuit position. The arm 54 carries at its upper outer extremity a roller 58 pivotally mounted upon stud 59, the end of the roller extending into the path of movement of a cam surface 60 formed upon the inner edge of dial 20. This cam, which may be molded integrally with the dial structure itself, is formed with a slight arcuate depression 61 as shown in Fig. 6 for example, adapted to receive the end of roller 58 and to provide for the seating thereof in this position. The cam also is formed with an extended cam surface 62 in order to maintain engagement with roller 58 for a predetermined portion of the rotation of dial 20. The switch 50 is positioned directly in the baking element circuit. In the embodiment shown this switch is of the single pole type. And in such case it is preferred that this single pole be positioned in the side of the line opposite that controlled by the thermostatic switch 40, 41. In this way it is provided that both sides of the baking element circuit will be opened when the oven is turned to the "off" position. If desired however switch 50 may comprise a double series of contacts operable to effect the control of both sides of the bake element circuit, to positively assure that in the off position both sides thereof will be permanently locked in open position.

Figure 4:
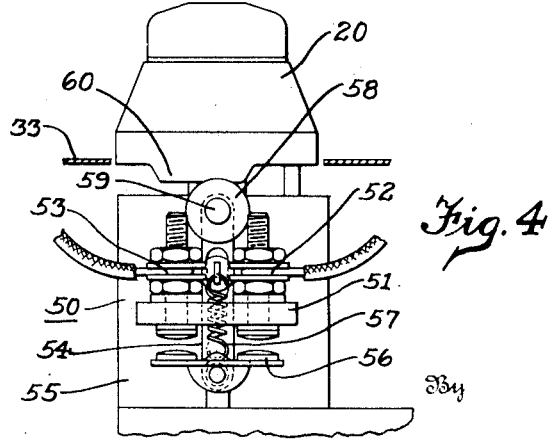
Fig. 4 is a side elevational view of the side opposite Fig. 2.
Figure 5:
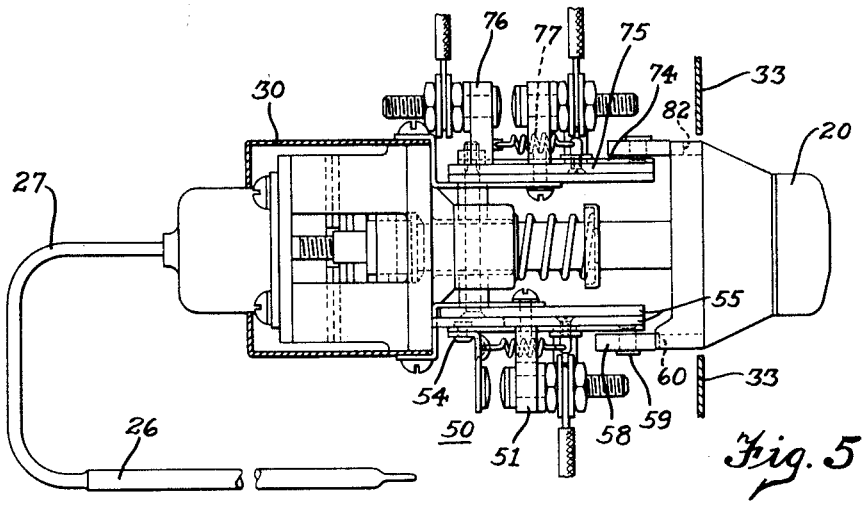
Fig. 5 is a horizontal view partly in section and partly in elevation through the mechanism.

It will be understood that in the normal operation of the baking elements, the relation of the dial 20, and cam 60 with respect to roller 58 is such that the cam 60 does not engage roller 58. Consequently spring 57 maintains the contacts in closed circuit position throughout the range of adjustment of the thermostat device thereby providing for the desired regulation of the baking element under the control of the thermostat device. This also applies to the 70 position of the dial. When however the dial is turned beyond this 70 position and into the off position, the sloping face of cam 60 engages roller 58, which rides upon the surface of the cam and in the final off position the roller centers itself within the grooved portion 61, giving to the operator by sense of touch the final accurate positioning of the control in off position. And in such position the contact assembly is moved to the spaced position shown in Fig. 4, thereby opening the baking oven element circuit.

Where a broiler element is positioned within the same oven compartment with baking elements, it is usually desired to prevent the simultaneous energization of both elements, to avoid the supplying of excessive heat within the oven compartment. And in cases where the broiler is positioned in a separate compartment, it is also sometimes desired to prevent simultaneous energization of the elements because of the fact that both baking and broiling elements are of relatively large capacity and simultaneous energization thereof place a heavy load upon the power source. This requires adequate wiring, metering, etc. facilities, and in view of the fact that an additional charge for power is made in some cases under these circumstances, and further in view of the fact that it is seldom necessary to conduct simultaneously a baking and broiling operation, means are provided for preventing the simultaneous energizing of the baking and the broiling element. And in accordance with the present invention this means is conveniently associated directly with and operable by the single control dial 20.

For this purpose there is provided a broiler switch indicated generally by the reference numeral 70, this switch being located preferably also upon the thermostat housing 30, and upon the side opposite the bake oven switch 50. This mechanism comprises a contact carrying block 71 which is mounted upon the housing member 30. This insulated contact block supports the two contacts 72 and 73 to which are connected the leads from the outside wires of the power source. A sliding contact assembly is provided including the sliding plate 74 which is mounted for longitudinal sliding movement in guideways 75 provided upon the housing structure. A contact carrying insulating member 76 is mounted upon the end of the slide 74, spring means 77 attached thereto tending to normally move the assembly into circuit closing position. The assembly supports the pair of contact making elements 78 and 79 connected to the broiling element and adapted to cooperate with the stationary contacts 72, 73 respectively, in closed circuit position, to effect the energizing of the broiler element.

A roller 80 is mounted upon stud 81 which is fastened to the outer end of the slide 74. This roller is so positioned that it engages the end surface of dial 20 and is moved thereby into a position to effect the spacing of the movable contact assembly 76 away from the fixed contact assembly 71, thereby maintaining the broiler switch in open circuit position. This spacing is maintained throughout the range of adjustment of the dial from off position through its highest temperature position. When the dial is so adjusted that cam 60 is brought into operative engagement with roller 58, the movable contact assembly is still further actuated away from closed circuit position. As the dial is rotated beyond the off position however a grooved portion 82 formed in the end surface of dial 20 comes into cooperative relation with roller 80, permitting the roller to move into the groove, under action of the spring member, thereby effecting the closing of the contacts. This position of the dial is indicated on its face by the designation "Broil" located beyond the off position thereof. A pin 83 fixed in the frame of the thermostat cooperates with a lug 84 formed on the dial 20 to prevent rotation of the dial beyond the broil position in one direction and beyond the highest heat (550°) position in the other direction. It will be noted that the extended cam surface 62 provides for maintaining the bake oven elements in disconnected condition during the movement of the dial to this broil position. Thus the mechanism prevents closing of the broiling element circuit except during such time as the bake oven circuit is definitely locked in open circuit position. And similarly, the bake oven is maintained in open circuit position during the time that the broiling element circuit is closed. There is thus provided in a highly simple and satisfactory manner a means for effecting the entire control of the oven and broiler from a single control device. The device includes not only a means for regulating the temperature of the oven during the baking operation, but it further provides for the positive disconnection of the baking elements from the power line when desired during the off condition, and also provides for the interrelated control of baking and broiling operations to prevent simultaneously energizing these elements.

Cross-reference is made to applicants' copending application Serial No. 74,037 filed concurrently herewith.

As shown in the circuit diagram, a three-wire power source 23 is preferably provided, the cooking top elements being connected between alternate outside wires and the neutral wire, the baking and broiling elements being connected selectively across the outside wires. There is also preferably provided a pilot indicating means in the bake oven circuit. This serves to indicate when the oven circuit is in energized condition, under the control of the thermostat. This pilot preferably is constructed as shown comprising the series resistor 90 in the bake oven line, in shunt with which there is placed the small voltage indicating lamp 91. In this way a very low voltage lamp for indicating purposes may be utilized, and the necessity for a special high voltage lamp, for example, a 220 volt lamp where the customary three-wire power source is provided, is not required.

While the forms of apparatus herein described constitute preferred embodiments of the invention it is to be understood that the invention is not limited to these precise forms of apparatus, and that changes may be made therein without departing from the scope of the invention which is defined in the appended claims.

What is claimed is:

1. An electric heating arrangement for a stove of the character described and adapted to be connected to a power source comprising a baking element energizable from said power source for supplying heat to said oven, a broiler element also energizable from said power source, a thermostatic device controlling the energizing of said baking element adjustable from an off position to a plurality of temperature regulating positions, means preventing the energizing of said broiling element in any of said temperature regulating positions, means operable in the off position of said device for positively disconnecting said baking element from said power source, and means operable only when said baking element is disconnected providing for the connection of said broiling element.

2. In an electric heating arrangement of the character described and adapted to be connected to a power source, an oven, a baking element and a broiling element energizable from said power source for supplying heat to said oven, a thermostatic device adjustable from an off position to a plurality of temperature regulating positions for controlling the energizing of said baking element to maintain a desired temperature within said oven, means operable in the off position of said device for opening the circuit to said baking element and preventing energization thereof, and means operable only when said baking element is de-energized for effecting energizing of said broiling element from said power source.

3. An electric heating arrangement of the character described and adapted to be connected to a power source comprising an oven, a baking element and a broiling element selectively energizable from said power source, thermostatic means for controlling the energizing of said baking element to maintain a desired temperature within said oven, adjusting mechanism for said thermostatic device, means operable in one position of said adjusting means for positively opening the circuit to said baking element, and means operable in another position of said adjusting means for effecting the energizing of said broiling element.

4. An electric heating arrangement of the character described and adapted to be connected to a power source comprising an oven, a baking and broiling element energizable from said power source, thermostatic control means for controlling the operation of said baking element to provide for maintaining a desired temperature within said oven, and a single control member providing for the adjusting of said thermostatic device to regulate the temperature condition within the oven, for preventing simultaneous energization of said broiling and baking elements, and for positively opening the circuit to said baking element to maintain the same in de-energized condition.

5. An electric heating arrangement of the character described and adapted to be connected to a power source comprising an oven, a baking and a broiling element energizable from said power source, and a single control device for controlling the operation of said oven comprising a control member operable over a range of temperature regulating positions, an off position and a broil position, means effective in the temperature regulating positions for controlling the setting of the thermostatic means to regulate the temperature within the oven, means operable in the said off position for positively opening the circuit to said baking element, means operable in the broil position for closing the broiler element circuit.

6. An electric heating arrangement of the character described and adapted to be connected to a power source comprising an oven, a baking and a broiling element energizable from said power source, and a single control device for controlling the operation of said oven comprising a control member operable over a range of temperature regulating positions, an off position and a broil position, means operable in the temperature regulating positions to control the regulation of the temperature within the oven, means operable throughout such position and the off position for preventing the energizing of said broiling element, and means operable in said broil position for energizing said broiling element and preventing energization of said baking elements.

BERTRAND B. KAHN.
CARL J. HAKE.